United States Patent
Miura

(10) Patent No.: US 6,285,388 B1
(45) Date of Patent: Sep. 4, 2001

(54) IMAGE FORMING APPARATUS HAVING A PLURALITY OF IMAGE-FORMING MODES AND METHOD OF CONTROLLING THE APPARATUS

(75) Inventor: Tatsuyuki Miura, Yokohama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/525,050

(22) Filed: Mar. 14, 2000

(51) Int. Cl.[7] .......................................................... B41J 2/47
(52) U.S. Cl. ............................................. 347/235; 347/250
(58) Field of Search ..................................... 347/129, 131, 347/247, 251, 253, 260, 235, 250; 399/82, 85

(56) References Cited

FOREIGN PATENT DOCUMENTS 9-083786    3/1997   (JP) .

Primary Examiner—Huan Tran
Assistant Examiner—Hai C. Pham
(74) Attorney, Agent, or Firm—Foley & Lardner

(57) ABSTRACT

When the image-forming modes are switched over, the difference between the scan speeds of image-forming modes before and after the mode switching is checked. If the difference is not less than a predetermined set value, the adjustment of a laser beam is executed first, and then image formation is started. If the difference between the scan speeds of image-forming modes before and after the mode switching is less than the predetermined set value, the image formation is started immediately without making adjustment of the laser beam.

8 Claims, 3 Drawing Sheets

IMAGE FORMING APPARATUS HAVING A PLURALITY OF IMAGE-FORMING MODES AND METHOD OF CONTROLLING THE APPARATUS

BACKGROUND OF THE INVENTION

In an image forming apparatus, such as a copying machine, a facsimile machine or a printer, a laser beam emitted from a semiconductor laser (e.g., a laser diode) is scanned over the surface of a photosensitive drum (which serves as an image bearing member), so as to form an electrostatic latent image on the surface of the photosensitive drum. The electrostatic latent image is developed with a developing agent (toner), and then transferred onto a sheet.

The laser beam emitted from the laser diode falls on a galvano-mirror, by which it is reflected and incident on a polygonal mirror. The laser beam incident on the polygonal mirror is reflected, and it is scanned over the surface of the photosensitive drum in the axial direction thereof in accordance with the rotation of the polygonal mirror. A scan performed in the axial direction of the photosensitive drum is generally referred to as a main scan. This main scan is repeatedly executed in accordance with the rotation of the photosensitive drum. The direction in which the main scan repeatedly executed on the photosensitive drum is shifted (i.e., the direction orthogonal to the direction of the main scan) is generally referred to a sub-scan direction.

The position of the laser beam can be adjusted in the sub-scan direction by use of the galvano-mirror.

The polygonal mirror is driven by a motor. The speed of the main scan is determined by the speed of this motor. In order to optimally determine the magnification of the image formation performed in the direction of the main scan, it is important to control the speed of the main scan to be an appropriate value.

In the case of a complex-type image forming apparatus which has both a copy mode and a print mode as its image-forming modes, the speed of the motor of the polygonal mirror (i.e., the speed of the main scan of the laser beam) is control to be different between the copy mode and the print mode.

In the copy mode, an image on a document is optically read, and the laser beam is modulated in accordance with the read image data. In the copy mode, therefore, the speed of the motor of the polygonal mirror is determined in consideration of the movement of the optical system used for optically reading a document image.

In the print mode, the laser beam is modulated in accordance with image data that are externally input. In the print mode, therefore, the speed of the motor of the polygonal mirror is determined without reference to the movement of the optical system.

Speed-determining data, which determine the motor speed in the copy mode and that in the print mode, are stored in a memory. On the basis of the speed-determining data in the memory, the speed of the motor of the polygonal mirror is controlled.

In the complex-type image forming apparatus described above, the laser beam has to be adjusted in consideration of the phenomenon that the speed of the motor of the polygonal mirror changes when the image-forming mode is switched from one to the other. It should be noted, however, that the adjustment of the laser beam inevitably results in a stand-by state before the execution of image formation.

BRIEF SUMMARY OF THE INVENTION

The present invention is intended to provide an image forming apparatus wherein is not necessarily set in a stand-by state when the image-forming mode is switched to another, and which can therefore provide a high operating efficiency and is very useful to the user. The present invention is also intended to provide a method for controlling the apparatus.

An image forming apparatus according to the present invention scans a laser beam emitted from a semiconductor laser over an image bearing member and has a plurality of image-forming modes in which scan speeds are different. The apparatus comprises:

control means for first making adjustment of the laser beam and then starting image formation, if the difference between scan speeds of the image-forming mode before and after the mode switching is not less than a predetermined set value; and control means for starting the image formation immediately without making adjustment of the laser beam, if the difference between the scan speeds of the image-forming modes before and after the mode switching is less than the predetermined set value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

One embodiment of the present invention will now be described.

Figure 1:
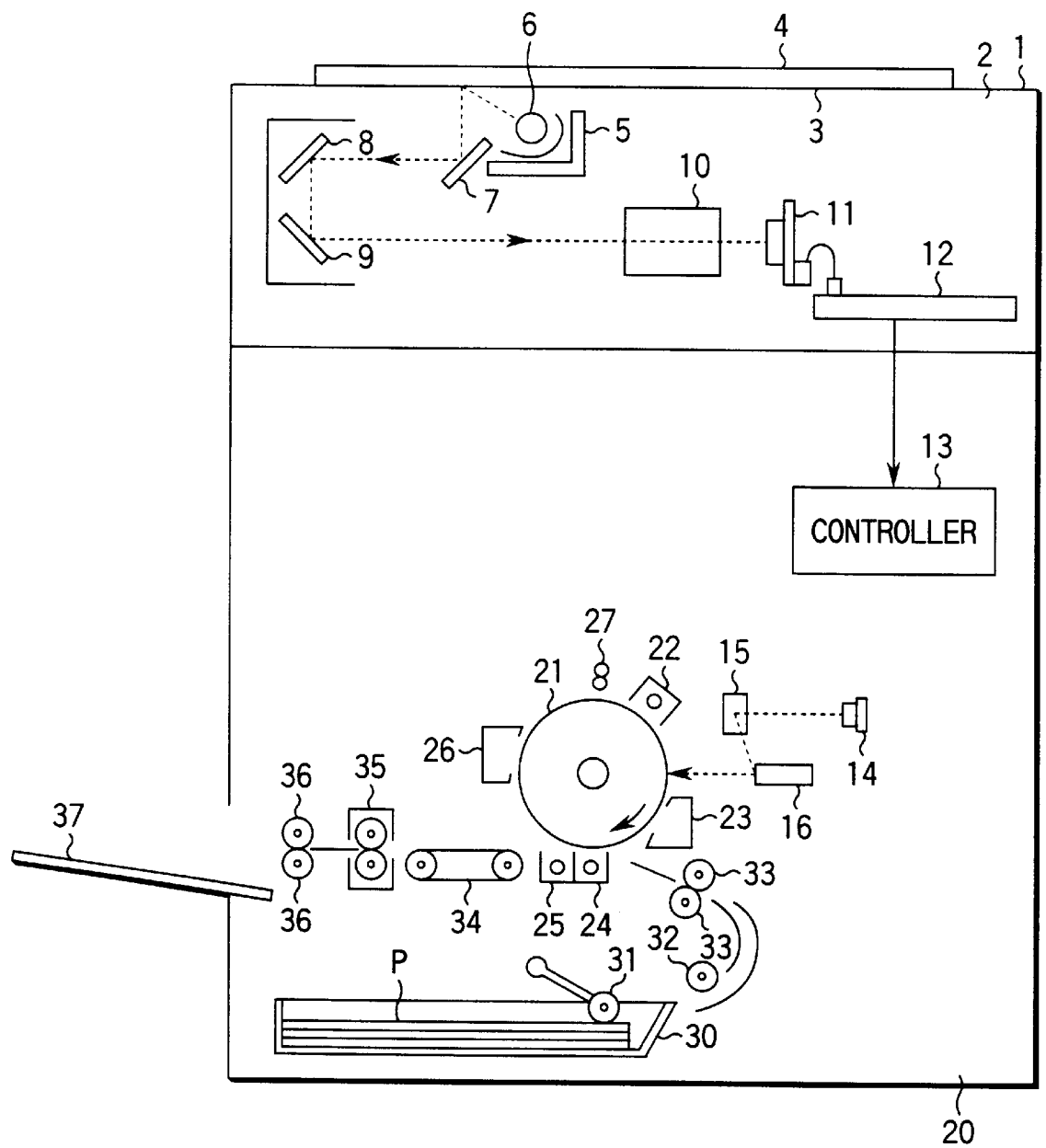
FIG. 1 is a view showing the entire structure of one embodiment.

In FIG. 1, numeral 1 denotes the main body of a complex-type image forming apparatus having a plurality of image-forming modes, such as a copy mode and a print mode. The main body 1 is provided with a reading section 2 and a recording section 20.

A document table 3, on which a document is placed, is provided on top of the reading section 2. A document cover 4 is provided on the document table 3 so that it can be opened or closed.

A carriage 5 is arranged under the document table 3 so that it can be moved back and forth. The carriage 5 is provided with an exposure lamp 6. When the carriage 5 is moved back and forth, with the exposure lamp 6 switched on, the entire surface of the document table 3 is optically scanned.

By this optical scan, a reflected-light image of the document on the document table 3 is obtained. The reflected-light image is projected on a CCD sensor 11 by means of reflecting mirrors 7, 8 and 9 and a magnification-changing lens block 10. The CCD sensor 11 outputs an image signal whose voltage level corresponds to the amount of light received. The image signal is supplied to an image processing circuit 12. With respect to the image signal, the image processing circuit 12 executes a series of processing, such as shading processing and gamma processing, and outputs the resultant image data. This image data is supplied to a controller 13 provided in the recording section 20.

The controller 13 controls the driving of a semiconductor laser (e.g., a laser diode 14) in accordance with the image data. The laser diode 14 emits a laser beam.

The laser beam emitted from the laser diode 14 is incident on an adjusting device, such as a galvano-mirror 15. After being reflected thereby, the laser beam is incident on a deflector, such as a polygonal mirror 16. The polygonal mirror 16 reflects the laser beam, and the reflected laser beam is scanned over the surface of a photosensitive drum 21, which is an example of an image bearing member, in such a manner that it moves in the axial direction of the photosensitive drum 21.

A charging unit 22, a developing unit 23, a transfer unit 24, a separation unit 25, a cleaner 26 and a discharging unit 27 are arranged around the photosensitive drum 21. These structural elements are arranged in the order mentioned. A sheet supply cassette 30 is located under the photosensitive drum 21.

The sheet supply cassette 30 contains a large number of copy sheets P. These sheets P are picked up one by one by a pickup roller 31. A picked-up sheet P is separated from the sheet supply cassette 30 by a separator 32 and is fed to sheet register rollers 33. By these sheet register rollers 33, the sheet P is supplied into the region between the photosensitive drum 21 and the transfer unit 24 in synchronism with the rotation of the photosensitive drum 21.

The charging unit 22 electrostatically charges the surface of the photosensitive drum 21. By this charging and the radiation of a laser beam to the photosensitive drum 21, an electrostatic latent image is formed on the photosensitive drum 21.

The developing unit 23 supplies a developing agent to the photosensitive drum 21. Owing to the supply of the developing agent, the electrostatic latent image on the photosensitive drum 21 is visualized. The charging unit 24 transfers the visualized image (i.e., a developer image) from the photosensitive drum 21 to the sheet P fed from the register rollers 33. After this transfer, the sheet P is separated from the photosensitive drum 21 by the separation unit 25. The separated sheet P is fed to a fixing unit 35 by a conveyance belt 34.

By the fixing unit 35, heat is applied to the sheet P so that the developer image on the sheet P is fixed. After passing through the fixing unit 35, the sheet P is discharged onto a tray 37 by conveyance rollers 36.

Figure 2:
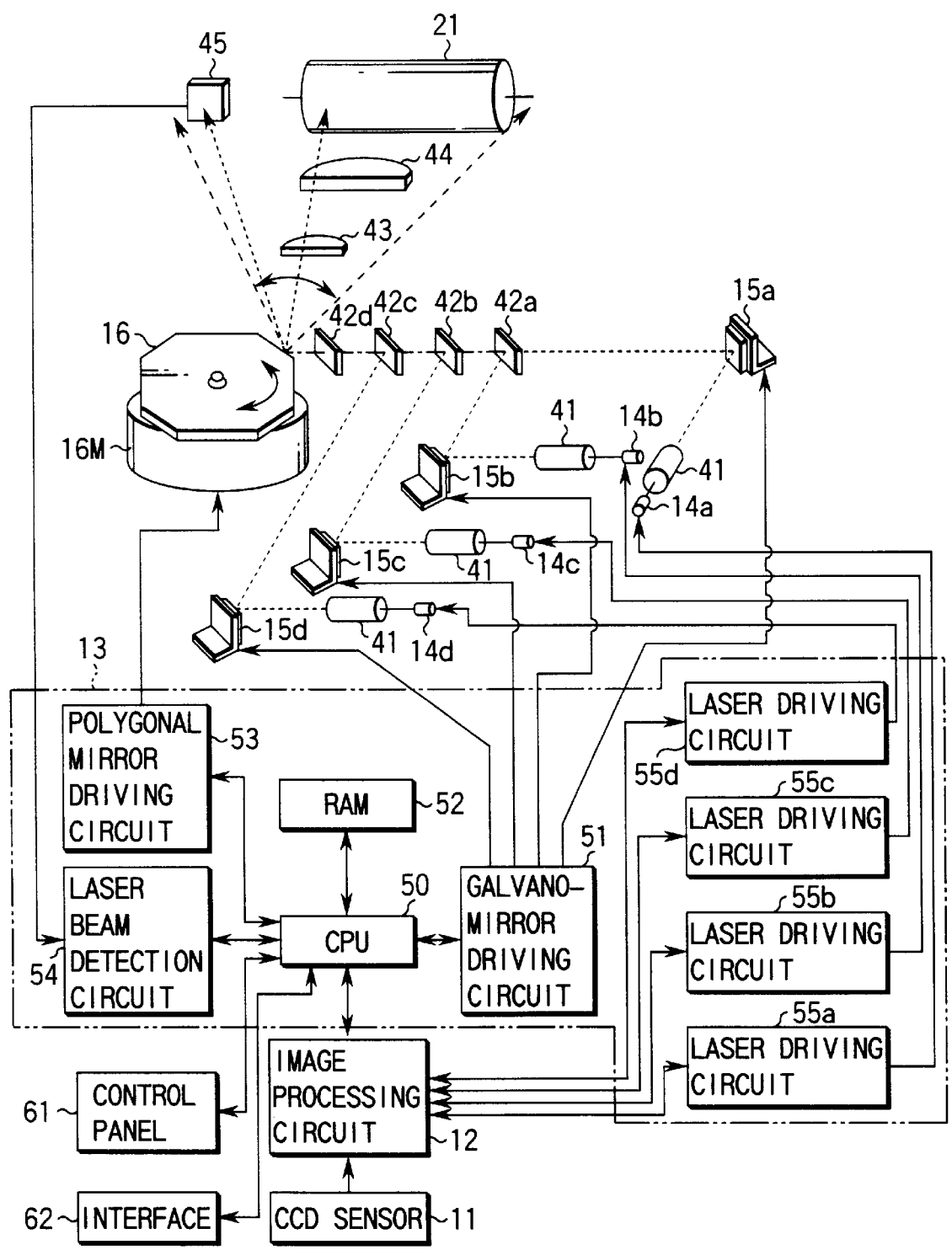
FIG. 2 is a block diagram showing the major portion of the embodiment.

FIG. 2 shows the specific structure of the peripheral portions of the polygonal mirror 16 and the major portion of the controller 13.

In actuality, the laser diode 14 described above is made up of four divisions, namely, laser diodes 14a, 14b, 14c and 14d. Likewise, the galvano-mirror 15 is made up of four divisions, namely, mirrors 15a, 15b, 15c and 15d.

The polygonal mirror 16 is provided with a motor 16M and is rotated thereby. The speed at which the photosensitive drum 21 is scanned (main scan) is determined in accordance with the speed of the motor 16.

Laser beams emitted from the laser diodes 14a, 14b, 14c and 14d strike on the galvano-mirrors 15a, 15b, 15c and 15d and reflected thereby, respectively. The laser beam reflected by galvano-mirror 15a passes through half-mirrors 42a, 42b, 42c and 42d and then falls on the polygonal mirror 16. The laser beam reflected by galvano-mirror 15b strikes on the half-mirror 42a, is reflected thereby, passes through the half-mirrors 42b, 42c and 42d, and then falls on the polygonal mirror 16. The laser beam reflected by galvano-mirror 15c strikes on the half-mirror 42b, is reflected thereby, passes through the half-mirrors 42c and 42d, and then falls on the polygonal mirror 16. The laser beam reflected by galvano-mirror 15d strikes on the half-mirror 42c, is reflected thereby, passes through the half-mirror 42d, and then falls on the polygonal mirror 16.

The four laser beams guided to the polygonal mirror 16 are spaced from each other by predetermined distances in a direction orthogonal to the rotating direction of the polygonal mirror 16.

The four laser beams falling on the polygonal mirror 16 are reflected thereby. In accordance with the rotation of the polygonal mirror 16, the laser beams are scanned over the surfaces of the photosensitive drum 21 in the axial direction of the photosensitive drum 21. The scan executed in the axial direction of the photosensitive drum 21 is generally referred to as a main scan. This main scan is repeatedly performed in accordance with the rotation of the photosensitive drum 21. The direction in which the main scan is shifted on the photosensitive drum 21 (i.e., the direction orthogonal to the direction of the main scan) is generally referred to as a sub-scan direction.

Lenses 43 and 44 are arranged between the polygonal mirror 16 and the photosensitive drum 21.

The scan range of each laser beam includes the region corresponding to the overall length of the photosensitive drum 21, i.e., from one axial end to the other axial end, and further includes a predetermined region that is in the vicinity of the above-mentioned one axial end. A photodetector 45 is arranged in this predetermined region.

Upon receipt of a laser beam, the photodetector 45 outputs an electric signal. This output is supplied to both the image processing circuit 12 and the controller 13.

The controller 13 is provided with: a CPU (a central processing unit) 50, which is a central element for control; a galvano-mirror driving circuit 51 for driving the galvano-mirrors 15a, 15b, 15c and 15d; a RAM (a random access memory) 52 for storing a plurality of pieces of speed-determining data, which determine the speed of the motor 16M in accordance with each of the image-forming modes (i.e., the copy mode and the print mode); a polygonal mirror driving circuit 53 for driving the motor 16; a laser beam detection circuit 54 for detecting when the main scan starts on the basis of the output of the light detection circuit 45 and for detecting the amount of light of each laser beam; and laser driving circuits 55a, 55b, 55c and 55d for driving the laser diodes 14a, 14b, 14c and 14d, respectively, in accordance with the image data supplied from the image processing circuit 12.

A control panel 61, which serves as an operating means, is connected to the CPU 50. An interface 62, which enables connection of an external device, is also connected to the CPU 50. By operating the control panel 61, each of the image-forming modes (the copy mode and the print mode) can be selected, or the start of the image formation can be operated. A personal computer, for example, can be connected to the interface 62. The connection of the personal computer enables the speed-determining data in the RAM 52 to be rewritten.

Figure 3:
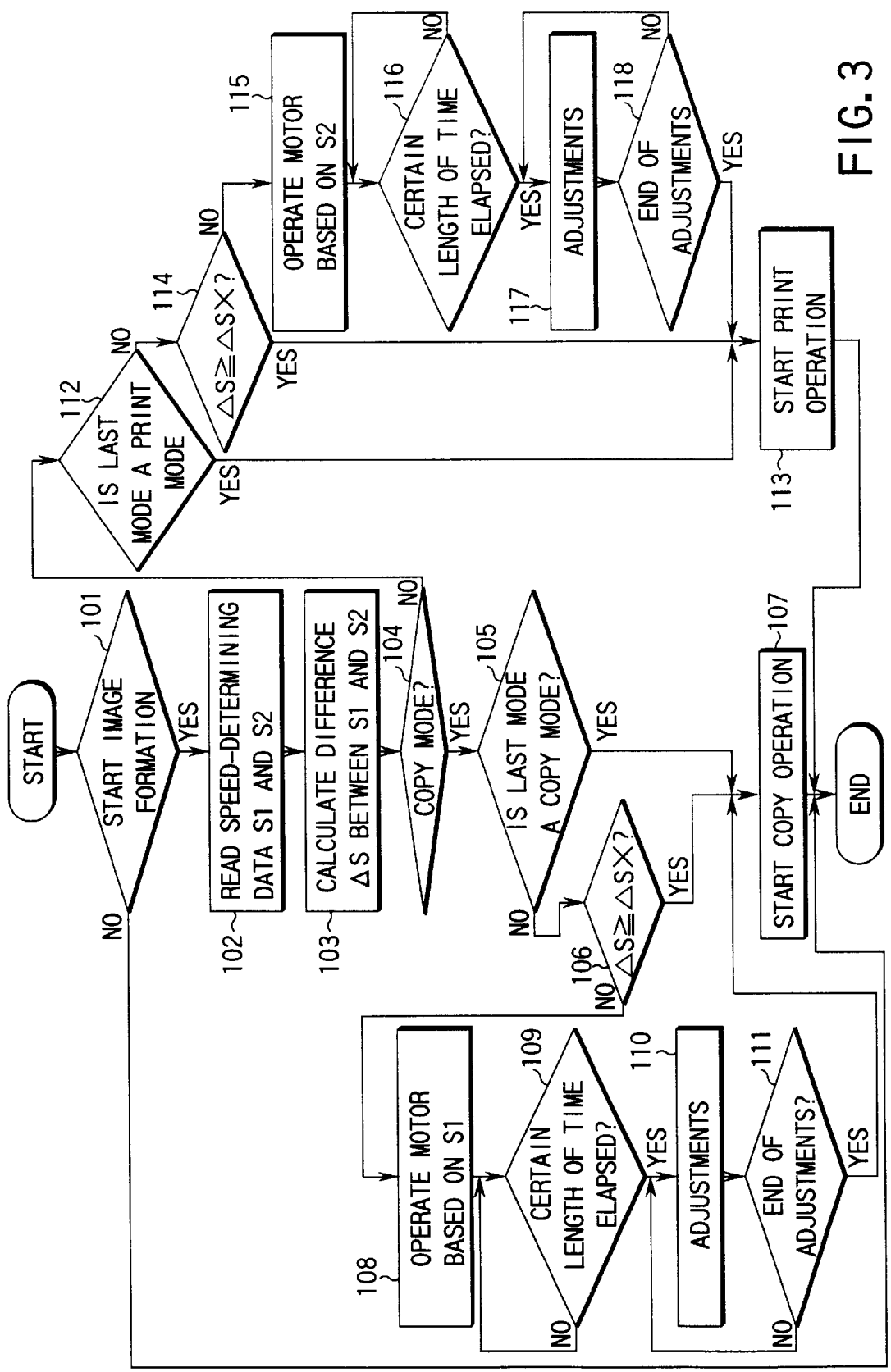
FIG. 3 is a flowchart illustrating the operation of the embodiment.

The operation will now be described with reference to the flowchart shown in FIG. 3.

The speed-determining data in the RAM 52 may be properly rewritten or updated when there is a change in the environmental conditions of the main body 1, when the photosensitive drum 21 is replaced with a new one, when maintenance is executed, or the like.

When an arbitrary image-forming mode is selected and the start of image formation is designated by operating the control panel 61 ("YES" in step 101), the speed-determining data S1 and S2 in the RAM 52 are read out (step 102), and the difference ΔS between speeds S1 and S2 is calculated (step 103). Speed-determining data S1 determines the speed at which the motor 16 is rotated in the copy mode, while speed-determining data S2 determines the speed at which the motor 16 is rotated in the print mode.

If the image-forming mode selected presently is the copy mode ("YES" in step 104), and the image-forming mode selected last is also the copy mode ("YES" in step 105), then a copying operation is started immediately (step 107).

If the image-forming mode selected presently is the copy mode ("YES" in step 104), and the image-forming mode selected last is the print mode ("NO" in step 105), it follows that the mode is switched over from the print mode to the copy mode. At the time of this switching, the calculated speed difference ΔS is compared with predetermined set value ΔSx (step 106).

If the speed difference ΔS is less than the set value ΔSx ("YES" in step 106), it is determined that a desirable copy of good quality can be made without any change in the setting conditions. Based on this determination, the copy operation is started immediately (step 107). Since the apparatus is not set in the stand-by state in this case, the operation efficiency improves, and the user may not be irritated.

If the speed difference ΔS is not less than the set value ΔSx ("NO" in step 106), the motor 16 is driven on the basis of the speed-determining data S1 for the copy mode (step 108). After a certain length of time, which is required for the motor 16 to stably rotate at the predetermined speed, has elapsed ("YES" in step 109), each laser beam is adjusted.

To be more specific, the speed of the motor 16 is controlled in such a manner that the position of each laser beam, as viewed in the main scan direction, becomes optimal. The galvano-mirrors 15a, 15b, 15c and 15d are adjusted in such a manner that the position of each laser beam, as viewed in the sub-scan direction, becomes optimal. In addition, the optical outputs of the laser diodes 14a, 14b, 14c and 14d are adjusted in such a manner that the amount of light of each laser beam becomes optimal.

After these adjustments are made ("YES" in step 111), the copy operation is started (step 107). Although the apparatus is set in the stand-by state before the start of the copying operation in this case, it is possible to make a desirable copy of good quality.

If the image-forming mode selected presently is the print mode ("NO" in step 104), and the image-forming mode selected last is also the print mode ("YES" in step 112), then a print operation is started immediately (step 113).

If the image-forming mode selected presently is the print mode ("NO" in step 104), and the image-forming mode selected last is the copy mode ("NO" in step 112), it follows that the mode is switched over from the copy mode to the print mode. At the time of this switching, the speed difference ΔS is compared with the set value ΔSx (step 114).

If the speed difference ΔS is less than the set value ΔSx ("YES" in step 114), it is determined that a desirable copy of good quality can be made without any change in the setting conditions. Based on this determination, the print operation is started immediately (step 113). Since the apparatus is not set in the stand-by state in this case, the operation efficiency improves, and the user may not be irritated.

If the speed difference ΔS is not less than the set value ΔSx ("NO" in step 114), the motor 16 is driven on the basis of the speed-determining data S2 for the print mode (step 115). After a certain length of time, which is required for the motor 16 to stably rotate at the predetermined speed, has elapsed ("YES" in step 116), each laser beam is adjusted.

To be more specific, the speed of the motor 16 is controlled in such a manner that the position of each laser beam, as viewed in the main scan direction, becomes optimal. The galvano-mirrors 15a, 15b, 15c and 15d are adjusted in such a manner that the position of each laser beam, as viewed in the sub-scan direction, becomes optimal. In addition, the optical outputs of the laser diodes 14a, 14b, 14c and 14d are adjusted in such a manner that the amount of light of each laser beam becomes optimal.

After these adjustments are made ("YES" in step 118), the print operation is started (step 113). Although the apparatus is set in the stand-by state before the start of the print operation in this case, it is possible to make a desirable copy of good quality.

As described above, a desirable copy can be made at all times, and the switching of the image-forming mode does not necessarily set the apparatus in the stand-by state. This being so, the operating efficiency is enhanced, and the apparatus is very useful to the user.

When the above embodiment was described, reference was made to the case where the number of image-forming modes is two. Needless to say, the present invention is applicable to the case where the number of image-forming modes is three or more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus which scans a laser beam emitted from a semiconductor laser over an image bearing member and has a plurality of image-forming modes in which scan speeds are different, said apparatus comprising:

first control means for first making adjustment of the laser beam and then starting image formation, if a difference between scan speeds of image-forming modes before and after mode switching is not less than a predetermined set value; and second control means for starting the image formation immediately without making adjustment of the laser beam, if the difference between the scan speeds of the image-forming modes before and after the mode switching is less than the predetermined set value.

2. An image forming apparatus according to claim 1, further comprising operating means for selecting each of the image-forming modes.

3. An image forming apparatus according to claim 1, wherein said first control means adjusts a scan position of the laser beam and an amount of light thereof.

4. An image forming apparatus which scans a laser beam emitted from a semiconductor laser over an image bearing member and has a plurality of image-forming modes in which scan speeds are different, said apparatus comprising:

a mirror, provided with a motor, for reflecting the laser beam emitted from the semiconductor laser while being rotated by the motor, such that the laser beam is scanned over the image bearing member;

a memory for storing data on a plurality of predetermined speeds, which are used for controlling a speed of the motor in accordance with each of the image-forming modes;

first control means for first making adjustment of the laser beam and then starting image formation, if a difference between speeds, which are included among the predetermined speeds in the memory and used in image-forming modes before and after mode switching, is not less than a predetermined set value;

second control means for starting the image formation immediately without making adjustment of the laser beam, if the difference between the speeds, which are included among the predetermined speeds in the memory and used in image-forming modes before and after the mode switching, is less than the predetermined set value.

5. An image forming apparatus according to claim 4, further comprising operating means for selecting each of the image-forming modes.

6. An image forming apparatus according to claim 4, wherein said first control means adjusts a scan position of the laser beam and an amount of light thereof.

7. An image forming apparatus according to claim 4, wherein said memory is reprogrammable.

8. A method for controlling an image forming apparatus which scans a laser beam emitted from a semiconductor laser over an image bearing member and has a plurality of image-forming modes in which scan speeds are different, said method comprising the steps of:

making adjustment of the laser beam first, and then starting image formation, if a difference between the scan speeds of image-forming modes before and after mode switching is not less than a predetermined set value; and starting the image formation immediately without making adjustment of the laser beam, if the difference between the scan speeds of the image-forming modes before and after the mode switching is less than the predetermined set value.

* * * * *